June 11, 1968  E. B. PRAY  3,387,523
SHEAR CONSTRUCTION

Filed June 30, 1965  5 Sheets-Sheet 1

INVENTOR.
EDWIN B. PRAY
BY Pearce and Schaeperklaus
Attorneys

INVENTOR.
EDWIN B. PRAY
BY Pearce & Schaeperklaus
Attorneys

INVENTOR.
EDWIN B PRAY
BY Pearce and Schaeperklaus
Attorneys

June 11, 1968     E. B. PRAY     3,387,523

SHEAR CONSTRUCTION

Filed June 30, 1965     5 Sheets-Sheet 5

INVENTOR.
EDWIN B. PRAY
BY Pearce & Schaeperklaus

Attorneys

United States Patent Office 3,387,523
Patented June 11, 1968

3,387,523
SHEAR CONSTRUCTION
Edwin B. Pray, Springfield Township, Hamilton County, Ohio, assignor to Constellation Steel Mill Equipment Corporation, Cincinnati, Ohio, a corporation of Ohio
Filed June 30, 1965, Ser. No. 468,485
4 Claims. (Cl. 83—461)

This invention relates to a power operated shear. More particularly, this invention relates to a large size, power operated shear having a stationary blade and a pivoted blade.

An object of this invention is to provide a shear of this type in which means is provided for holding free ends of the blade in alignment as a cut is made.

A further object of this invention is to provide a machine of this type which includes a base on which the stationary blade is mounted, an arm pivotally mounted on the base and carrying the pivoted blade for swinging up and down, an arcuate horn extending upwardly from the base adjacent a free end of the stationary blade and a bracket attached to the arm and extending transversely of the horn and in which means on the bracket engages a face of the horn remote from the stationary blade to hold the arm in position with the blades aligned.

A further object of this invention is to provide a machine of this type in which the bracket extends outboard of the horn.

A further object of this invention is to provide a power operated shear of this type in which an upright bearing plate is mounted on the horn and in which the means on the bracket includes a back-up member mounted in the bracket and a bearing head between the back-up member and the bearing plate, there being spherical engaging faces on the back-up member and the bearing head to ensure face-to-face engagement between the bearing head and the bearing plate.

The above and other objects and features of the invention will be apparent to those skilled in the art to which this invention pertains from the following detailed description, and the drawings, in which.

From the following detailed description, and the drawings, like reference characters indicate like parts.

Figure 1:
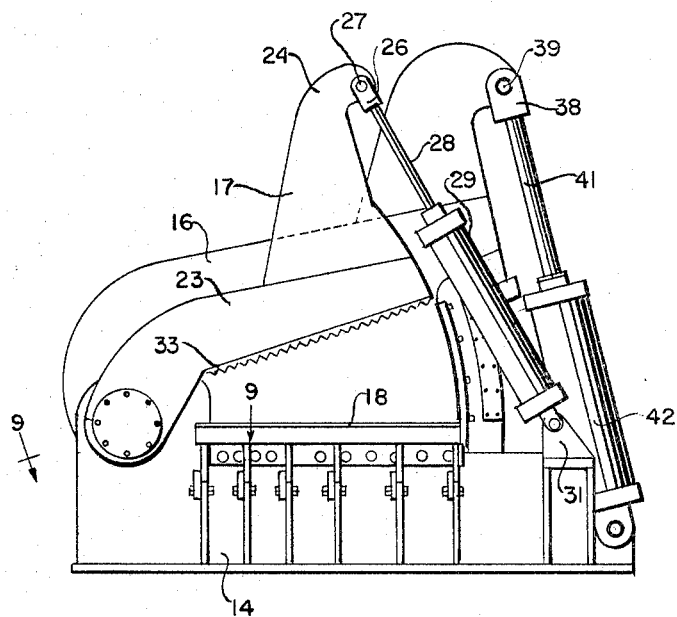
FIG. 1 is a view in side elevation showing a shear constructed in accordance with an embodiment of this invention, both arms thereof being shown in raised position.

In FIG. 1 is shown a shear which includes a base section 14 on which a shear arm 16 and a clamping or hold down arm 17 are pivotally mounted to swing about a common axis. The base includes tables members 18 and 18a (FIG. 7) carried by supports 19 and 19a. Horizontal stationary shear blade sections 21 (only one of which is shown) are mounted on the table along one side thereof. Bolts 22 hold the blade sections 21 in position.

Figure 9:
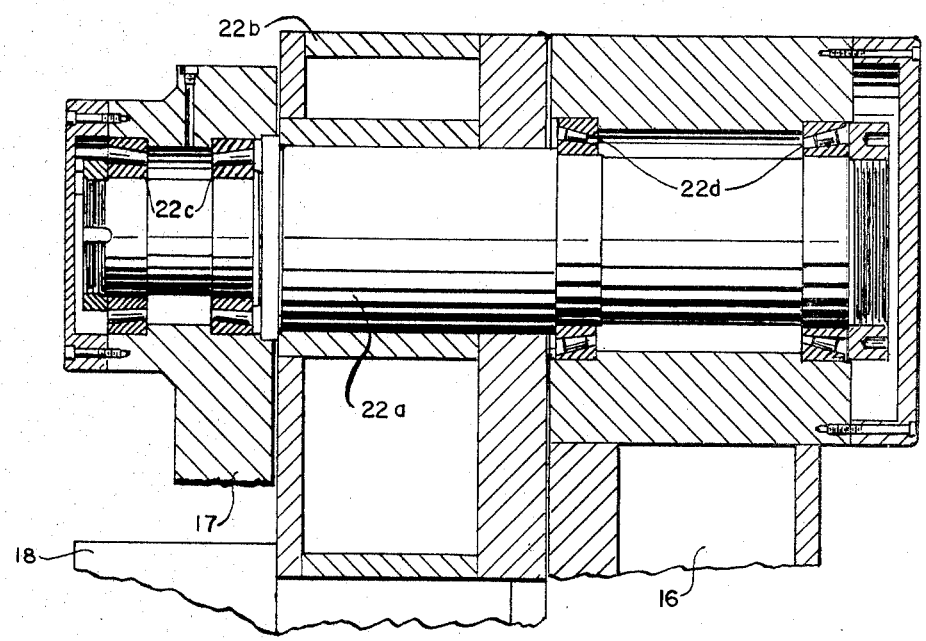
FIG. 9 is a view in section on an enlarged scale taken on the line 9—9 in FIG. 1.

As shown in FIG. 9, the shear arm 16 and the hold down arm 17 are both pivotally mounted on a shaft 22a. The shaft 22a, in turn, is mounted in a housing 22b supported on the base section. Appropriate bearings 22c and 22d mounted on the shaft 22a support the shear arm 16 and the hold down arm 17 for swinging movement.

Figure 2:
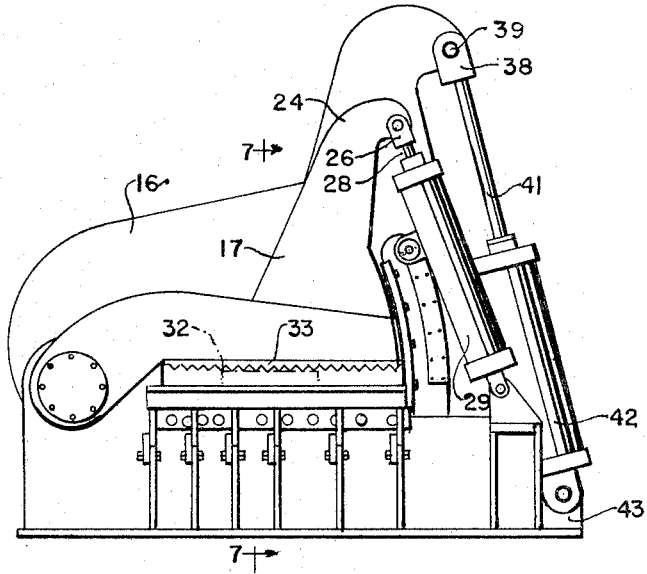
FIG. 2 is a view in side elevation of the shear illustrated in FIG. 1 with a clamping arm thereof shown in lowered operating position, a work piece being shown in dot-dash lines.
Figure 7:
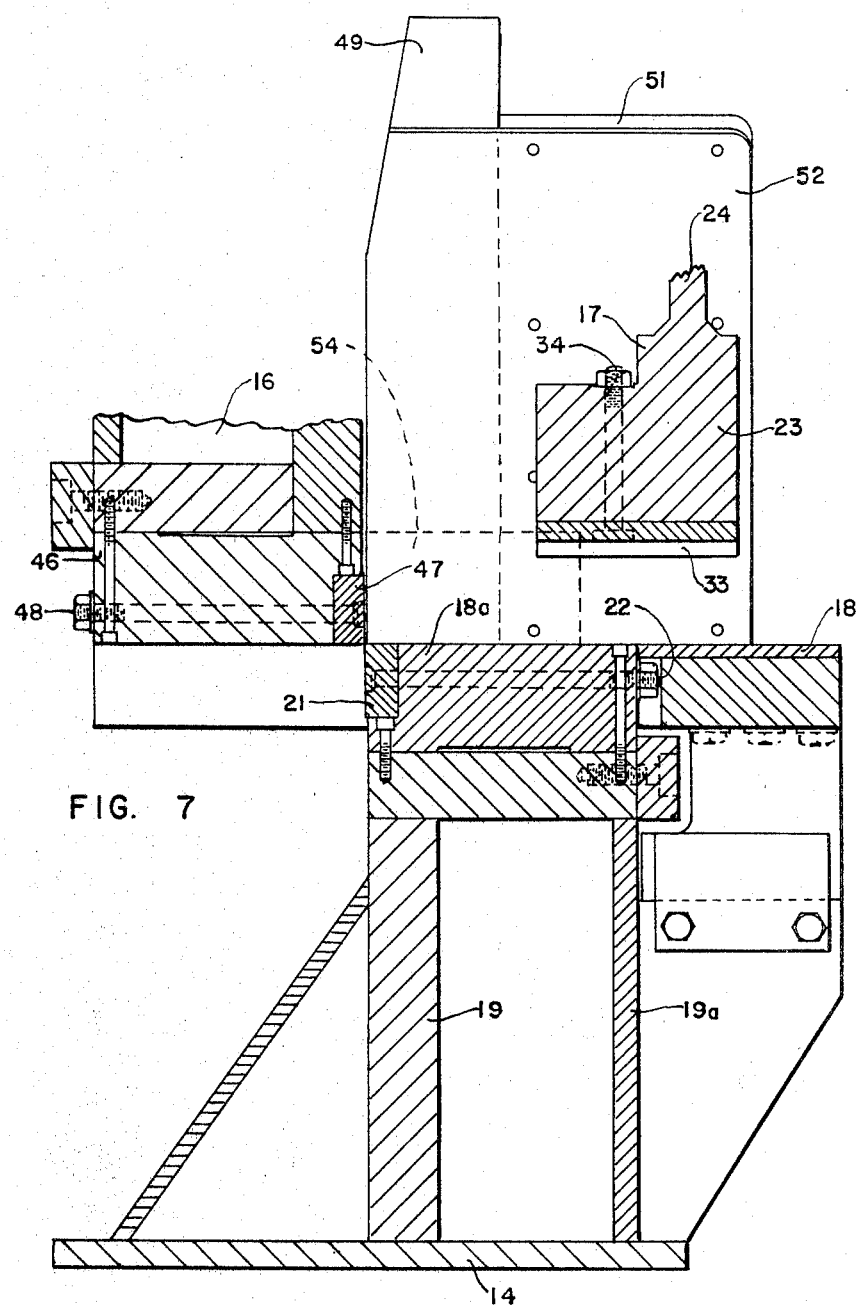
FIG. 7 is an enlarged view in section taken on the line 7—7 in FIG. 2.

The clamping arm 17 includes a main arm section 23 and an upwardly extending nose section 24. At an upper end of the nose section is mounted a clevis 26 (FIG. 1) which swings on a clevis pin 27. A piston rod 28 is attached to the clevis 26 and operates in a hydraulic cylinder 29. A lower end of the cylinder 29 is pivotally mounted on a plate 31 mounted on the base section. Operation of the cylinder 29 causes raising of the piston rod 28 and the clamping arm 17 from the FIG. 2 position to the FIG. 1 position and lowering of the clamping arm 17 from the FIG. 1 position to the FIG. 2 position. When the clamping arm is lowered to the FIG. 2 position, it is adapted to hold work 32 in position for shearing. A work gripping member 33 is attached to the lower face of the main arm section 23 by bolts 34, as indicated in FIG. 7.

The shear arm 16 (FIGS. 3 and 4) includes a main arm section 36 and an upwardly extending nose section 37. A clevis 38 is pivotally mounted on a clevis pin 39 which is mounted in the nose section 37. A piston rod 41, which is attached to the clevis pin 39, operates in a hydraulic cylinder 42. The lower end of the cylinder 42 is pivotally connected to a plate 43 mounted on the base section 14. Operation of the cylinder 42 can raise and lower the piston rod 41 and cause the shear arm 16 to swing up and down between the lowered position of FIG. 4 and the raised position of FIG. 3. A tool holding bar 46 is attached to the underside of the shear arm 16. Shear blade sections 47 are attached to the tool holding bar 46 by means of bolts 48, as shown in FIG. 7.

Figure 3:
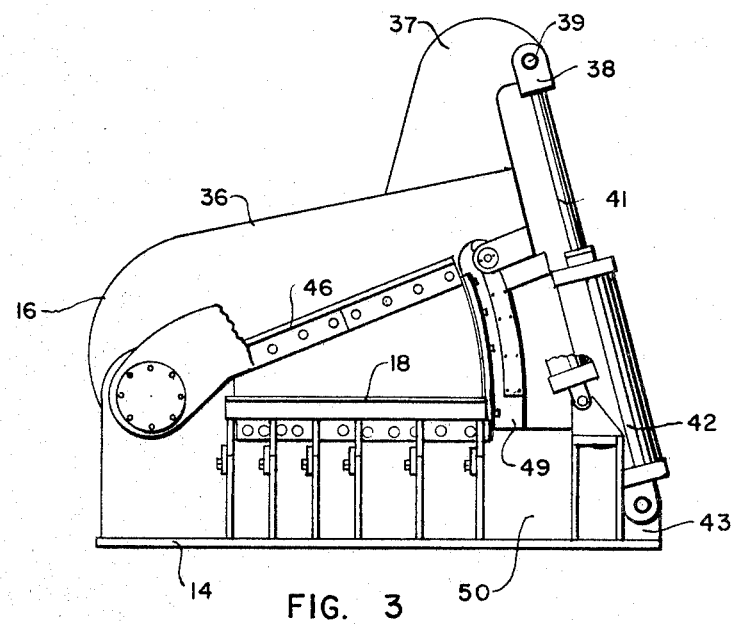
FIG. 3 is a view in side elevation of the machine illustrated in FIGS. 1 and 2 with the clamping arm broken away to reveal details of construction of a shear arm thereof, the shear arm being shown in raised position.
Figure 4:
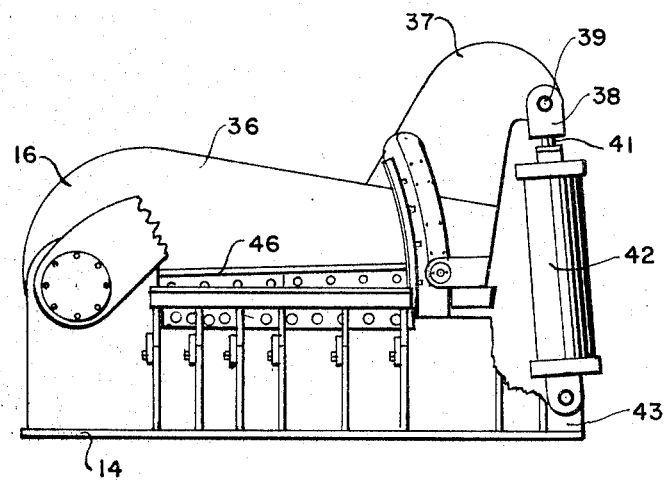
FIG. 4 is a view in side elevation of the machine illustrated in FIGS. 1 to 3, inclusive, with the clamp arm broken away, the shear arm being shown in lowered position.
Figure 5:
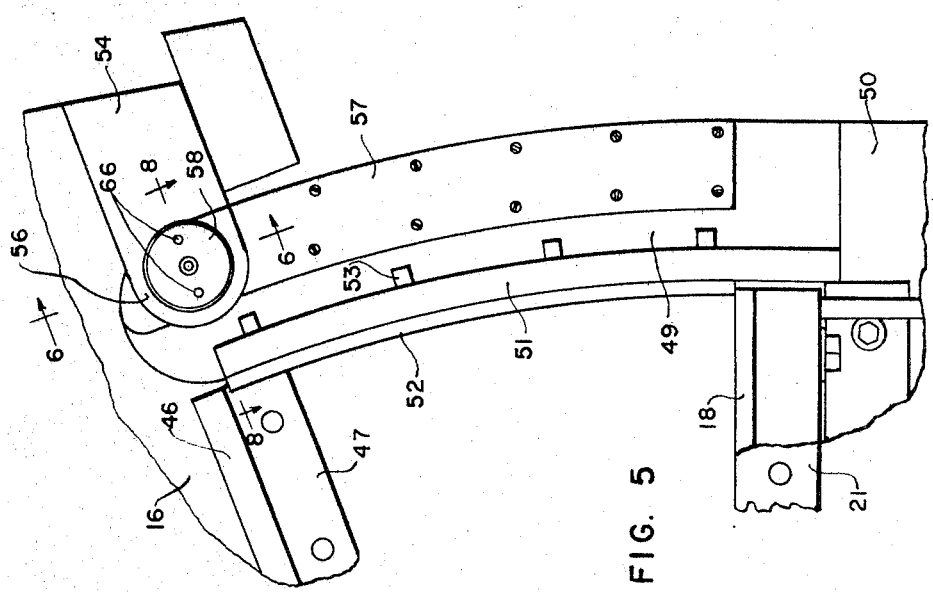
FIG. 5 is an enlarged fragmentary view in side elevation showing details of construction of a horn forming a part of the machine and elements associated therewith.

As shown most clearly in FIGS. 3 and 5, an arcuate upstanding horn 49 is fixedly mounted on a base member 50, which is a part of the base section 14, adjacent the table member 18 and adjacent the shear arm 16. An upstanding back-up plate 51 (FIG. 5) is rigidly welded to the horn 49 and to the base member 50 to support the horn in rigid upright position. A scuff plate 52 is attached to the back-up plate by screws 53 and extends upwardly from the table members 18 and 18a adjacent outer ends of the shear blades 21 and 47, as shown in FIGS. 5 and 7, to prevent work mounted on the table members 18 and 18a from engaging the horn and to keep the work in alignment with the shear blades and in position to be sheared thereby.

Figure 8:
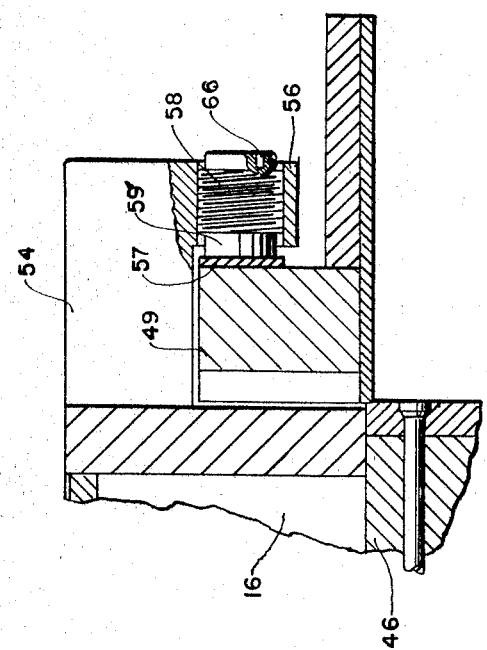
FIG. 8 is a view in section taken on the line 8—8 in FIG. 5.
Figure 6:
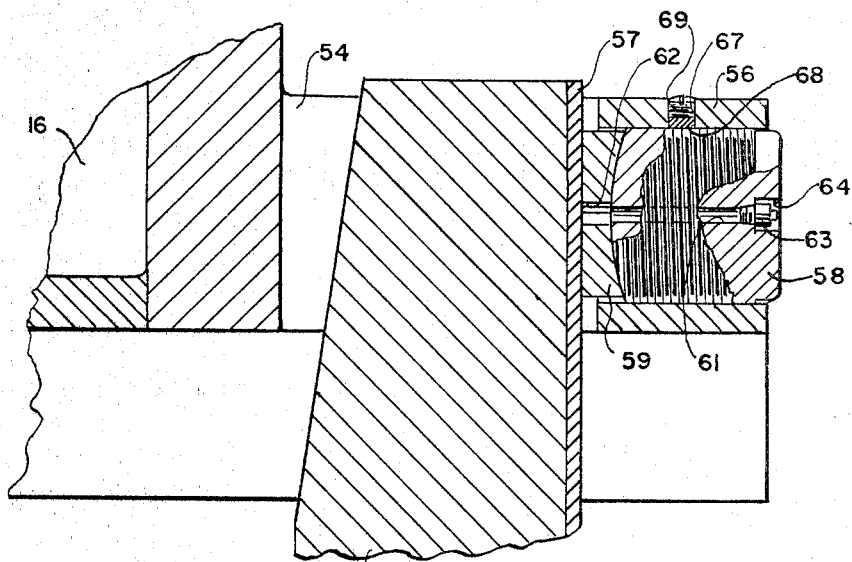
FIG. 6 is an enlarged view in section taken on the line 6—6 in FIG. 5.

An angle-shaped bracket 54 is attached to the shear arm 16 by welding. As shown in FIGS. 5 and 6, an arm 56 thereof is opposite the horn 49. An arcuate bearing or wear plate 57 is mounted on the horn 49 opposite the arm 56. A back-up screw 58 is threaded in the arm 56 and holds a bearing member 59 in engagement with the bearing plate 57 to prevent springing of the shear arm 16 and the moveable shear blade section 47 away from the stationary shear blade sections 21 (to the left, as indicated in FIG. 7). As shown in FIG. 6, the inner end of the back-up screw 58 has a convex spherical surface which engages a concave spherical surface in the bearing member 59. The back-up screw 58 and the bearing member 59 are provided with aligned bores 61 and 62, respectively. Grease can be introduced into the bores 61 and 62 through a fitting 63 mounted in a counterbore section 64 of the bore 61. Sockets 66 (FIGS. 5 and 8) in the back-up screw 58 make possible ready turning thereof to adjust the position of the shear arm.

As shown in FIG. 6, a transverse bore 67 in the arm 56 intersects the bore in which the back-up screw 58 is received. A lock plug 68 of a resin such as that commonly called "nylon" is held against the back-up screw 58 by a set screw 69 to lock the back-up screw in position.

The shear construction illustrated in the drawings and described above is subject to structural modification without departing from the spirit and scope of the appended claims.

Having described my invention, what I claim as new and desire to secure by Letters Patent, is:

1. A shear which comprises a table, a stationary shear blade mounted on said table, a shear arm pivotally mounted on said table, a shear blade mounted on said shear arm for cooperating with the stationary shear blade, means for engaging work on the table to hold the work in position for shearing by the shear blades, a horn mounted on the table adjacent free ends of the shear blades, a bracket attached to the shear arm and extending transversely of the horn, means mounted on the bracket and engaging a side of the horn remote from the shear arm to hold free ends of the shear blades in operative position, and a work retaining plate mounted on the horn and extending upwardly from the table adjacent the path of movement of the free end of the shear blade on said shear arm to keep the work aligned with the shear blades.

2. A shear which comprises a table, a stationary horizontal shear blade mounted on said table, a shear arm pivotally mounted on said table, a shear blade mounted on said shear arm for cooperating with the stationary shear blade, a hold-down arm pivotally mounted on the table coaxially with the shear arm for engaging work on the table to hold the work in position for shearing by the shear blades, an arcuate horn mounted on the table coaxial with the shear arm and adjacent free ends of the shear blades, a bracket attached to the shear arm and extending transversely of the horn, means mounted on the bracket and engaging a side of the horn remote from the shear arm to hold free ends of the shear blades in operative position, an arcuate work retaining plate coaxial with the shear arm and mounted on the horn and extending upwardly from the table adjacent the path of movement of the free end of the shear blade on said shear arm and adjacent a free end of the hold-down arm, and means for drawing the hold-down arm downwardly to engage and hold the work in alignment with the shear blades.

3. A shear which comprises a table, a stationary horizontal shear blade mounted on said table, a shear arm pivotally mounted on said table, a shear blade mounted on said shear arm for cooperating with the stationary shear blade, means for engaging work on the table to hold the work in position for shearing by the shear blades, a horn mounted on the table adjacent free ends of the shear blades, a bracket attached to the shear arm and having a portion extending transversely of the horn and a portion opposed to a side of the horn remote from the shear arm, an arcuate wear plate attached to said side of the horn coaxially with the shear arm, there being a bore in said opposed portion parallel to the axis, a bearing member in said bore engaging the wear plate, a back-up screw threaded in said bore and engaging the bearing member to hold free ends of the shear blades in operative position, and a work retaining plate mounted on the horn and extending upwardly from the table adjacent the path of movement of the free end of the shear blade on said shear arm to keep the work aligned with the shear blade.

4. A shear which comprises a table, a stationary horizontal shear blade mounted on said table, a shear arm pivotally mounted on said table, a shear blade mounted on said shear arm for cooperating with the stationary shear blade, a horn mounted on the table adjacent free ends of the shear blades, a bracket attached to the shear arm and having a portion extending transversely of the horn and a portion opposed to a side of the horn remote from the shear arm, an arcuate wear plate attached to said side of the horn coaxially with the shear arm, there being a bore in said opposed portion parallel to the axis, a bearing member in said bore engaging the wear plate, and a back-up screw threaded in said bore and engaging the bearing member to hold free ends of the shear blades in operative position, a work retaining plate mounted on the horn and extending upwardly from the table adjacent the path of movement of the free end of the shear blade on said shear arm, and means for engaging work on the table to hold the work in position for shearing by the shear blades.

References Cited
UNITED STATES PATENTS

| | | | |
|---|---|---|---|
| 484,984 | 10/1892 | Wesel | 83—609 X |
| 644,956 | 3/1900 | Williams | 83—609 X |
| 3,195,387 | 7/1965 | Telfer | 83—609 X |

ANDREW R. JUHASZ, *Primary Examiner.*